United States Patent
Kontny et al.

(10) Patent No.: US 9,835,220 B2
(45) Date of Patent: Dec. 5, 2017

(54) SHOCK ABSORBER WITH HYDRAULIC REBOUND SYSTEM

(71) Applicant: BeijingWest Industries, Co., Ltd., Beijing (CN)

(72) Inventors: Marek Karol Kontny, Krakow (PL); Tomasz Roman Szostek, Bielsko Biala (PL)

(73) Assignee: BEIJINGWEST INDUSTRIES, CO., LTD., Beijing (CN)

( * ) Notice: Subject to any disclaimer, the term of this patent is extended or adjusted under 35 U.S.C. 154(b) by 0 days.

(21) Appl. No.: 15/151,516

(22) Filed: May 11, 2016

(65) Prior Publication Data
US 2017/0097063 A1      Apr. 6, 2017

Related U.S. Application Data

(60) Provisional application No. 62/237,034, filed on Oct. 5, 2015.

(51) Int. Cl.
*F16F 9/36*     (2006.01)
*F16F 9/58*     (2006.01)

(52) U.S. Cl.
CPC ............. *F16F 9/366* (2013.01); *F16F 9/585* (2013.01)

(58) Field of Classification Search
CPC ............... F16F 9/366; F16F 9/585; F16F 9/49
(Continued)

(56) References Cited

U.S. PATENT DOCUMENTS

| 3,150,747 A * | 9/1964 | Bliven ..................... F16F 9/49 137/516.15 |
| 4,312,499 A * | 1/1982 | Wossner .................. F16F 9/49 188/288 |

(Continued)

FOREIGN PATENT DOCUMENTS

| CN | 103890441 A | 6/2014 |
| CN | 104541085 A | 4/2015 |

(Continued)

OTHER PUBLICATIONS

European Search Report; Eight (8) Pages; Dated Mar. 8, 2017.
Chinese Office Action; 5 pages; dated Jul. 31, 2017.
Japanese Office Action; 4 pages; dated Sep. 26, 2017.

*Primary Examiner* — Thomas J Williams
*Assistant Examiner* — Mariano Sy
(74) *Attorney, Agent, or Firm* — William H. Honaker; Dickinson Wright PLLC

(57) ABSTRACT

The ring guide of the hydraulic stop mechanism defines at least one channel spaced from the passage, extending axially from the lower surface toward the upper surface, and terminating adjacent to the catcher. The catcher defines at least one window extending from the upper surface toward the lower surface establishing fluid communication with the channel. The retainer includes a second protrusion disposed at the coupling end of the retainer extending outwardly engaging the piston rod. The piston rod defines a pair of slots. A first slot is spaced from the rod support and the piston and extends about the piston rod for receiving the ring guide. A second slot is spaced from the piston and the first slot, and extends about the piston rod for receiving the second protrusion of the retainer. The ring guide includes a plurality of passages and channels alternating with one another about the ring guide.

9 Claims, 3 Drawing Sheets

(58) Field of Classification Search
USPC .................................................. 188/297, 284
See application file for complete search history.

(56) References Cited

U.S. PATENT DOCUMENTS

| | | | | |
|---|---|---|---|---|
| 4,328,960 | A * | 5/1982 | Handke | F16F 9/49 |
| | | | | 188/284 |
| 4,345,748 | A | 8/1982 | Wossner et al. | |
| 4,838,393 | A * | 6/1989 | Mourray | F16F 7/082 |
| | | | | 188/284 |
| 5,024,301 | A * | 6/1991 | Cook | F16F 9/48 |
| | | | | 188/284 |
| 5,667,041 | A * | 9/1997 | Jensen | F16F 9/49 |
| | | | | 188/275 |
| 9,593,697 | B2 * | 3/2017 | Baalmann | F16F 9/49 |
| 2002/0104723 | A1 * | 8/2002 | Obst | F16F 9/49 |
| | | | | 188/288 |
| 2006/0049014 | A1 * | 3/2006 | Vanspauwen | F16F 9/585 |
| | | | | 188/284 |
| 2011/0000753 | A1 * | 1/2011 | Kim | F16F 9/49 |
| | | | | 188/297 |
| 2012/0090931 | A1 * | 4/2012 | Krazewski | B60G 13/08 |
| | | | | 188/288 |
| 2015/0330475 | A1 * | 11/2015 | Slusarczyk | B21D 22/20 |
| | | | | 188/288 |
| 2016/0091046 | A1 * | 3/2016 | Soromenho | F16F 9/49 |
| | | | | 188/297 |

FOREIGN PATENT DOCUMENTS

| | | |
|---|---|---|
| DE | 102004005063 A1 | 9/2005 |
| DE | 102013220627 B3 | 1/2015 |
| JP | 2015161404 A | 9/2015 |
| WO | 2013092084 A1 | 6/2013 |

* cited by examiner

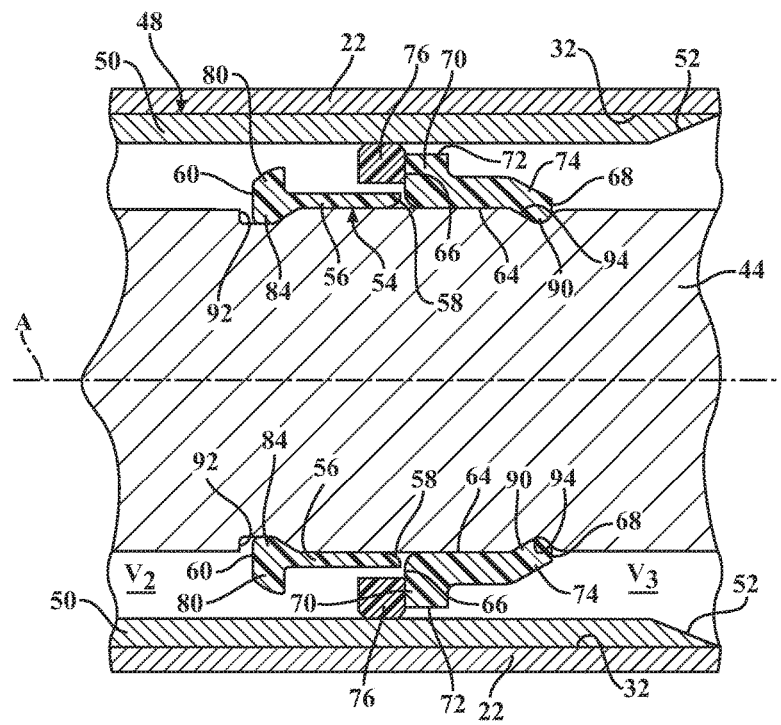

SHOCK ABSORBER WITH HYDRAULIC REBOUND SYSTEM

CROSS REFERENCE TO RELATED APPLICATION

This application claims the benefit of Provisional Application with Ser. No. 62/237,034 filed on Oct. 5, 2015, and entitled "A Shock Absorber with Hydraulic Rebound System."

BACKGROUND OF THE INVENTION

1. Field of the Invention

The present invention relates generally to a shock absorber assembly.

2. Description of the Prior Art

Such a shock absorber assembly is disclosed in an article by the Society of Automotive Engineers (SAE) titled "BWI Engineers Develop Improved Rebound Stop Performance." The figures in the article discloses the shock absorber assembly having a housing presenting a wall disposed along a center axis, extending between a first end and a second end, and defining an inner surface extending about the center axis enclosing a main chamber between the ends and the inner surface. A piston is disposed in the main chamber and slidably engages the inner surface. A piston rod is attached to the piston and axially movable along the center axis. A hydraulic stop mechanism including a force reducing device is disposed in the main chamber between one of the ends and the piston, attached to the piston rod, and defining a first rebound chamber between the one of the ends and the force reducing device and a second rebound chamber between the force reducing device and the piston for providing additional damping force in response to the axial movement of the piston.

The force reducing device includes a ring guide extending between a lower surface adjacent to the piston and an upper surface spaced from the lower surface. The ring guide defines at least one passage extending axially from the upper surface toward the lower surface, radially through the ring guide, and terminating before the lower surface for allowing hydraulic fluid to flow radially through the passage. A ring is slidably disposed about the ring guide between the upper surface and the lower surface and in sealing engagement with the inner surface of the wall. The ring is movable along the center axis between an unblocked position and a blocked position. In the unblocked position, the ring is disposed adjacent to the upper surface to establish fluid communication between the first rebound chamber, the passage, and the second rebound chamber. In the blocked position, the ring is abutting the lower surface of the ring guide to close the fluid communication between the first rebound chamber, the passage, and the second rebound chamber to provide additional damping force.

SUMMARY OF THE INVENTION

The invention provides for such a shock absorber assembly wherein the ring guide defines at least one channel spaced from the passage and extending axially from the lower surface, toward the upper surface, radially through the ring guide, and terminating before the upper surface for allowing additional hydraulic fluid to flow radially through the ring guide with the ring in the unblocked position to reduce hydraulic fluid pressure exerted on the ring guide.

The present invention allows for additional hydraulic fluid to flow through the ring guide in response to the axial movement of the piston rod and the piston thereby reducing hydraulic fluid pressure exerted on the ring guide and extending the performance life of the ring guide of the hydraulic stop mechanism.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a cross-sectional view of the hydraulic stop mechanism with the piston rod and the piston in the extension stroke, and FIG. 5 is a cross-sectional view of the hydraulic stop mechanism with the piston rod and the piston in the compression stroke.

DESCRIPTION OF THE ENABLING EMBODIMENT

Figure 1:
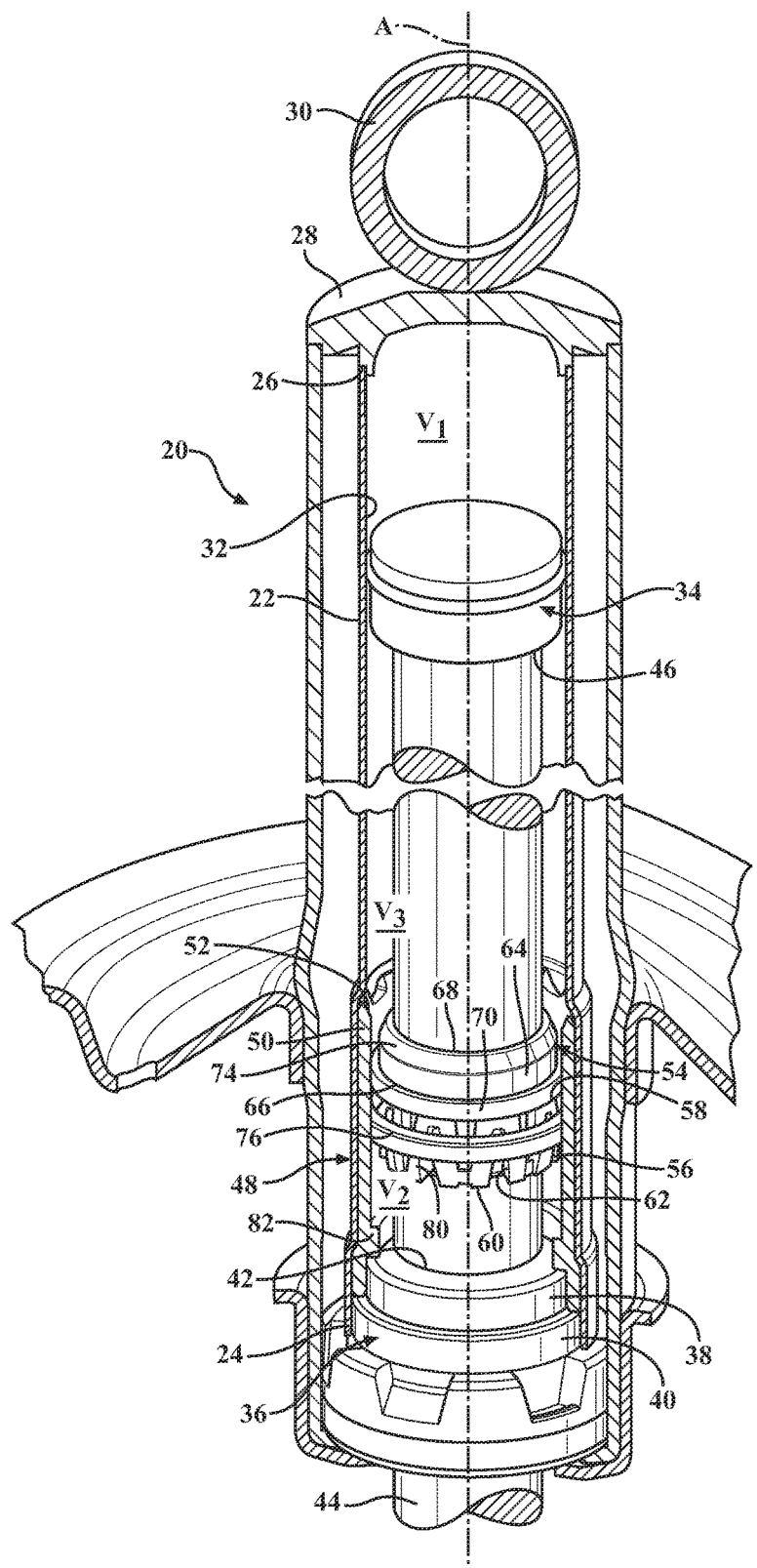
FIG. 1 is an cross-sectional perspective view of the shock absorber assembly.

Referring to the Figures, wherein like numerals indicate corresponding parts throughout the several views, a shock absorber assembly, constructed in accordance with the present invention is best shown in FIG. 1.

The assembly includes a housing 20, as generally shown in FIG. 1, having a tubular shape presenting a wall 22 disposed along and concentric to a center axis A and extending between a first end 24 and a second end 26. A cap 28 is disposed over the housing 20 at and to close the second end 26. A mounting ring 30 is disposed on and secured to the cap 28, adjacent to the second end 26 of the housing 20, for attaching the housing 20 to a vehicle. The wall 22 of the housing 20 defines an inner surface 32 extending annularly about and concentric with the center axis A enclosing a main chamber $V_1$, $V_2$, $V_3$ extending between the first end 24, the second end 26, and the inner surface 32.

A piston 34, as generally indicated, having a cylindrical shape is disposed in the main chamber $V_1$, $V_2$, $V_3$, concentrically to the center axis A, and spaced from the second end 26. The piston 34 is slidable along the center axis A and engages the inner surface 32 of the wall 22 dividing the main chamber $V_1$, $V_2$, $V_3$ into a compression chamber $V_1$ and an extension chamber $V_2$, $V_3$. The compression chamber $V_1$ extends between the second end 26 and the piston 34. The extension chamber $V_2$, $V_3$ extends between the piston 34 and the first end 24.

A rod support 36, as generally indicated, is disposed in the extension chamber $V_2$, $V_3$ adjacent and attached to the first end 24 of the housing 20 to seal the extension chamber $V_2$, $V_3$. The rod support 36 includes a body 38 having cylindrical shape disposed on and concentric to the center axis A and in the extension chamber $V_2$, $V_3$ of the housing 20. The body 38 of the rod support 36 is disposed adjacent to the first end 24 of the housing 20, concentric to and spaced from the piston 34 and the inner surface 32 of the housing 20. The body 38 further includes a projection 40 disposed adjacent to the first end 24 of the housing 20, extending radially outwardly from the body 38 in a perpendicular relationship with the center axis A, and annularly about the body 38 to the inner surface 32 of the wall 22 for engaging the inner surface 32 of the wall 22 to seal the extension chamber $V_2$, $V_3$. In other words, the projection 40 of the body 38 is attached to the inner surface 32 of the wall 22 to close the main chamber $V_1$, $V_2$, $V_3$. The body 38 of the rod support 36 defines a bore 42 having a cylindrical shape disposed on the center axis A and extends through the body 38 of the rod support 36, in communication with the main chamber $V_1$, $V_2$, $V_3$, along the center axis A.

A piston rod 44 having a cylindrical shape is disposed on the center axis A and extends through the bore 42 of the rod support 36 to a distal end 46. The piston rod 44 is attached to the piston 34 at the distal end 46 and axially movable along the center axis A for moving the piston 34 between a compression stroke and an extension stroke. In the compression stroke, the piston rod 44 and the piston 34 slide toward the second end 26 of the housing 20. In the extension stroke, the piston rod 44 and the piston 34 slide toward the rod support 36, away from the second end, and toward the first end 24 of the housing 20. As the piston rod 44 and the piston 34 move between the compression stroke and the extension stroke, the rod support 36 keeps the piston rod 44 aligned with the center axis A allowing the piston rod 44 to slide along the center axis A between the compression stroke and the extension stroke.

A hydraulic stop mechanism 48, as generally indicated, is disposed in the extension chamber $V_2$, $V_3$ of the main chamber $V_1$, $V_2$, $V_3$ for providing additional damping force in response to the axial movement of the piston rod 44 and the piston 34. The hydraulic stop mechanism 48 includes a collar 50 having a tubular shape, disposed in the extension chamber $V_2$, $V_3$, concentric to the center axis A, and attached to the projection 40 of the body 38 of the rod support 36. The collar 50 extends outwardly from the projection 40, annularly about the center axis A, abutting the body 38, along and in sealing engagement with the inner surface 32 of the wall 22, toward the second end 26 of the housing 20, and flaring outwardly from the center axis A to a wide end 52 spaced from the rod support 36. In other words, the collar 50 is attached to the projection 40 of the rod support 36, sandwiched between the body 38 of the rod guide and the inner surface 32 of the wall 22, and extends outwardly from the rod support 36 along the inner surface 32 of the wall 22 to the wide end 52.

Figure 2:
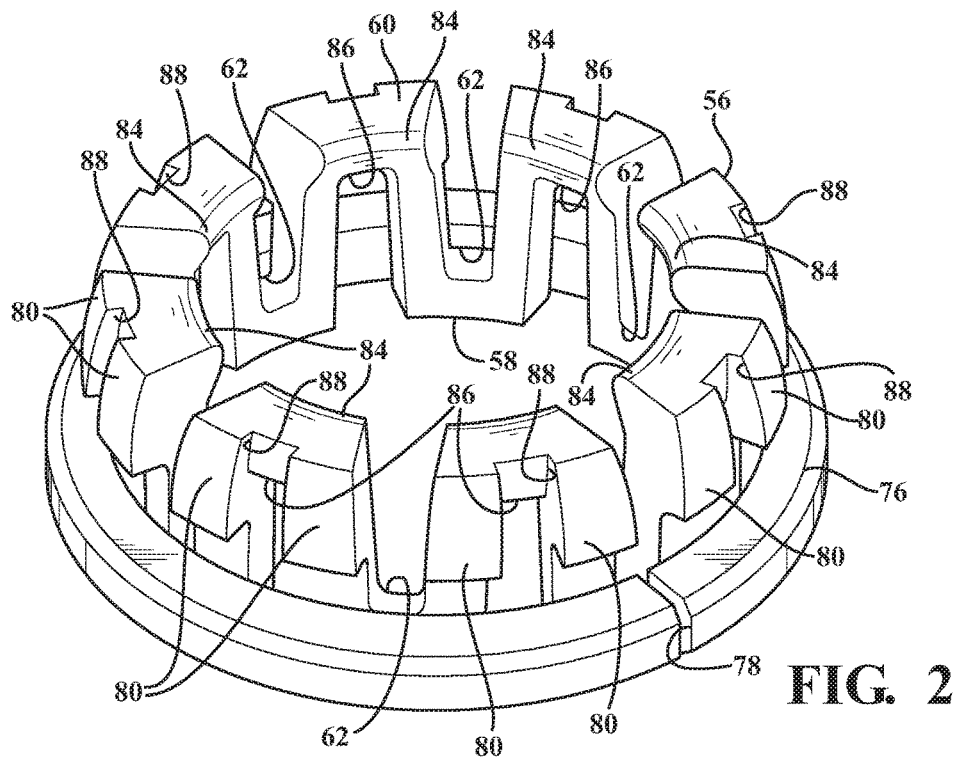
FIG. 2 is a perspective view from the upper surface of the ring guide including the ring of the force reducing device of the hydraulic stop mechanism.
Figure 3:
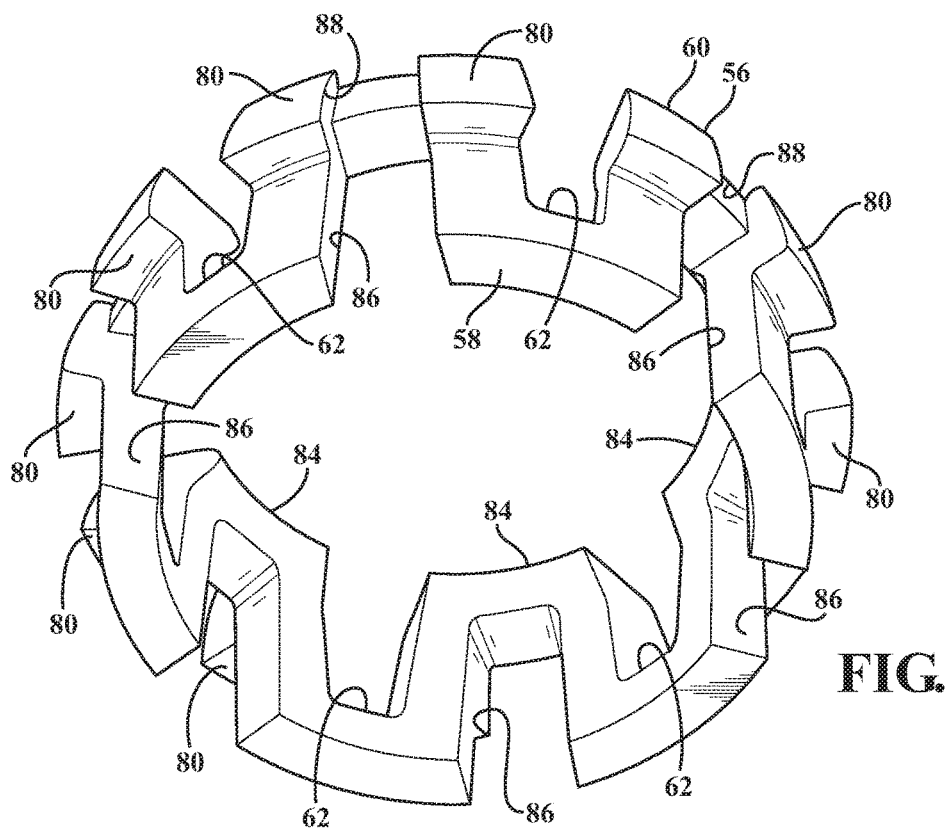
FIG. 3 is a perspective view from the lower surface of the ring guide of the force reducing device of the hydraulic stop mechanism.

The hydraulic stop mechanism 48 further includes a force reducing device 54, as generally indicated and best shown in FIGS. 2 and 3, disposed in the extension chamber $V_2$, $V_3$ of the main chamber $V_1$, $V_2$, $V_3$ between one of the first end 24 and the second end 26 of the housing 20. The force reducing device 54 is attached to the piston rod 44, spaced from the rod support 36 and the piston 34, and slidable along the center axis A between the rod support 36 and the wide end 52 of the collar 50. The force reducing device 54 divides the extension chamber $V_2$, $V_3$ into a first rebound chamber $V_2$ and a second rebound chamber $V_3$ for receiving the hydraulic fluid. The first rebound chamber $V_2$ extends between the first end 24 and the force reducing device 54. The second rebound chamber $V_3$ extends between the force reducing device 54 and the piston 34. Alternatively, instead of including the collar 50, the hydraulic stop mechanism 48 may only include a force reducing mechanism. In other words, the force reducing mechanism may be disposed in the extension chamber $V_2$, $V_3$ between the piston 34 and the rod support 36 and slidably engages the inner surface 32 of the wall 22.

The force reducing device 54 includes a ring guide 56 having a cylindrical shape and extends between a lower surface 58 and an upper surface 60. The lower surface 58 has a circular shape, disposed adjacent to the piston 34, and extends annularly about the piston rod 44. The upper surface 60 has a circular shape, disposed adjacent to the rod support 36, extends annularly about the piston rod 44, and spaced apart from the lower surface 58 and the rod support 36. The ring guide 56 defines at least one passage 62 having a rectangular shape extending axially from said upper surface 60, through the ring guide 56, toward the lower surface 58, and terminating before the lower surface 58 in a parallel relationship with the center axis A for allowing the hydraulic fluid to flow radially through the passage 62 and the ring guide 56. It should be appreciated that, other than the rectangular shape, the passage 62 may have a different shape, e.g. elliptical.

The force reducing device 54 includes a retainer 64 having a frusto-conical shape, disposed in the extension chamber $V_2$, $V_3$ of the main chamber $V_1$, $V_2$, $V_3$, spaced from the rod support 36 and the piston 34, attached to the piston rod 44, and extending annularly about the piston rod 44 for receiving the ring guide 56. The retainer 64 extends between a proximal end 66 and a coupling end 68. The proximal end 66 is disposed adjacent to and spaced from the ring guide 56 and extends annularly about the piston rod 44. Alternatively, the proximal end 66 of the retainer 64 may be disposed in an abutting relationship with the ring guide 56. The coupling end 68 is disposed adjacent to and spaced from the piston 34 and extends annularly about the piston rod 44. The retainer 64 includes a seat 70 extending annularly outwardly from the proximal end 66 of the retainer 64 in a perpendicular relationship with the center axis A, toward the collar 50, to an edge 72 spaced apart from the collar 50. The retainer 64 defines a slanted portion 74 extending outwardly from the edge 72 of the seat 70 and annularly along the center axis A and tapering toward the coupling end 68 of the retainer 64 connecting the proximal end 66 and the coupling end 68 with one another.

A ring 76 made from a plastic material and having a circular shape is slidably disposed about the ring guide 56 between the upper surface 60 and the lower surface 58 and is in sealing engagement with the collar 50 and the inner surface 32 of the wall 22. The ring 76 is movable along the center axis A between an unblocked position and a blocked position. In the compression stroke, as best shown in FIG. 5, the ring 76 is in the unblocked position with the ring 76 being disposed adjacent to the upper surface 60 to establish fluid communication between the first rebound chamber $V_2$, the passage 62, and the second rebound chamber $V_3$. In the extension stroke, as best shown in FIG. 4, the ring 76 is in the blocked position with the ring 76 abutting the seat 70 of the retainer 64 and the lower surface 58 to close fluid communication between the first rebound chamber $V_2$, the passage 62, and the second rebound chamber $V_3$ to provide additional damping force in the extension stroke. The ring 76 defines a gap 78 extending in a parallel relationship with the center axis A for accommodating with the expansion and the contraction of the ring 76 caused by hydraulic fluid pressure exerted on the ring 76 as the ring 76 is moved between the unblocked position in the compression stroke and the blocked position in the extension stroke. It should be appreciated that the ring 76 can be made using other materials, e.g. metal, ceramic, and elastomeric materials.

A catcher 80 having a D-shape in cross-section is disposed adjacent to the upper surface 60 of the ring guide 56. The catcher 80 extends radially outwardly from the ring guide 56, toward the collar 50, and in a perpendicular relationship with the center axis A to limit axial movement of the ring 76 along the ring guide 56. In other words, the catcher 80 engages the ring 76 in the unblocked position to establish fluid communication between the first rebound chamber $V_2$, the passage 62, and the second rebound chamber $V_3$.

The collar 50 of the hydraulic stop mechanism 48 includes a tab 82 disposed adjacent to the second end 26 of the housing 20. The tab 82 extends annularly outwardly from the collar 50, toward the center axis A, abutting the body 38 of the rod support 36, and spaced from the piston rod 44 and the catcher 80 of the ring guide 56 for receiving said ring 76 and preventing the ring 76 from engaging the rod support 36 in the extension position.

The ring guide 56 includes a first protrusion 84, disposed at the upper surface 60 of the ring guide 56, extending radially outwardly from the upper surface 60 of the ring guide 56, and toward the center axis A for engaging the piston rod 44.

The ring guide 56 further defines at least one channel 86 having a rectangular shape, spaced apart from the passage 62, extending axially from the lower surface 58 toward the upper surface 60, and radially through the ring guide 56 and the catcher 80. The channel 86 terminates adjacent to the catcher 80 and before the upper surface 60 in a parallel relationship with the center axis A and the passage 62 for allowing the hydraulic fluid to flow radially through the channels 86 and the ring guide 56 with the ring 76 in the unblocked position to reduce hydraulic fluid pressure exerted on the ring guide 56. In the enabling embodiment, the ring guide 56 includes a plurality of the passages 62 and a plurality of the channels 86 with the passages 62 and the channels 86 alternating with one another annularly about the ring guide 56. It should also be appreciated that, other than the rectangular shape, the channel 86 may have a different shape, e.g. elliptical.

The catcher 80 defines at least one window 88, having a rectangular shape, disposed on the catcher 80 and extending from the upper surface 60 toward the lower surface 58 to establish a fluid communication with the channel 86 of the ring guide 56 to allow additional hydraulic fluid flow through the channel 86 and the window 88 of the ring guide 56 to reduce fluid pressure exerted on the ring guide 56. In the enabling embodiment, the ring guide 56 includes a plurality of windows 88 disposed annularly around the catcher 80 and spaced from one another.

The retainer 64 includes a second protrusion 90 disposed at the coupling end 68 of the retainer 64 and extending outwardly from the coupling end 68 of the retainer 64 toward the center axis A for engaging the piston rod 44. The piston rod 44 defines a pair of slots 92, 94 including a first slot 92 and a second slot 94. The first slot 92 is disposed on the piston rod 44, adjacent to and space from the rod support 36 and the piston 34, and extends about the piston rod 44 for receiving the first protrusion 84 of the ring guide 56 to secure the ring guide 56 to the piston rod 44. The second slot 94 is disposed on the piston rod 44, adjacent to and spaced from the piston 34 and the first slot 92, and extends about the piston rod 44 for receiving the second protrusion 90 of the retainer 64 to the piston rod 44 to secure the retainer 64 to the piston rod 44. It should be appreciated that the present invention can be used in both twin tube shock absorbers and monotube shock absorbers.

In operation, as a vehicle travels down a road and, in response to the road conditions, the piston rod 44 and the piston 34 of the shock absorber, constructed in accordance with the present invention, moves between the compression stroke and the extension stroke. In the compression stroke, the piston rod 44 and the piston 34 move toward the second end 26 of the housing 20 compacting the hydraulic fluid disposed in the compression chamber $V_1$. At the same time, the force reducing device 54 of the hydraulic stop mechanism 48 attached to the piston rod 44 also moves toward the second end 26 of the housing 20. As the force reducing device 54 moves toward the second end 26 of the housing 20, the ring 76 disposed about the ring guide 56 slides along the ring guide 56 and abuts the catcher 80 of the ring guide 56 thereby establishing fluid communication between the first rebound chamber $V_2$, the passage 62, the channel 86, the window 88, and the second rebound chamber $V_3$ to allow the hydraulic fluid to flow through the ring guide 56.

In the extension stroke, the piston rod 44 and the piston 34 move toward the first end 24 of the housing 20 to compact the hydraulic fluid in the extension chamber $V_2$, $V_3$. At the same time, the force reducing device 54 of the hydraulic stop mechanism 48 attached to the piston rod 44 also moves toward the first end 24 of the housing 20. As the force reducing device 54 moves toward the first end 24 of the housing 20, the ring 76 disposed about the ring guide 56 slides along the ring guide 56 and abuts the seat 70 of the retainer 64 thereby closing fluid communication between the first rebound chamber $V_2$, the passage 62, the channel 86, the window 88, and the second rebound chamber $V_3$ to prevent the hydraulic fluid to flow through the ring guide 56 and provide additional damping force in the extension stroke.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A shock absorber assembly comprising;
    a housing presenting a wall disposed along a center axis and extending between a first end and a second end and defining an inner surface extending about said center axis enclosing a main chamber between said ends and said inner surface,
    a piston disposed in said main chamber and slidably engaging said inner surface,
    a piston rod attached to said piston and axially movable along said center axis,
    a hydraulic stop mechanism including a force reducing device disposed in said main chamber between one of said ends and said piston and attached to said piston rod and defining a first rebound chamber between said one of said ends and said force reducing device and a second rebound chamber between said force reducing device and said piston for providing additional damping force in response to the axial movement of said piston,
    said force reducing device including a ring guide attached to said piston rod and extending about said piston rod between a lower surface adjacent to said piston and an upper surface spaced from said lower surface,
    said ring guide defining at least one passage extending axially from said upper surface toward said lower surface and radially through said ring guide and terminating before said lower surface for allowing hydraulic fluid to flow radially through said passage, a ring slidably disposed about said ring guide between said upper surface and said lower surface and in sealing engagement with said inner surface of said wall and movable along said center axis between an unblocked position and a blocked position with said ring disposed in said unblocked position adjacent to said upper surface to establish fluid communication between said first rebound chamber and said passage and said second rebound chamber and with said ring disposed in said blocked position abutting said lower surface of said ring guide to close the fluid communication between said first rebound chamber and said passage and said second rebound chamber to provide additional damping force, said ring guide further including a catcher disposed adjacent to said upper surface of said ring guide extending radially outwardly from said ring guide toward said inner surface in a perpendicular relationship with said center axis to limit axial movement of said ring and engage said ring in said unblocked position to establish fluid communication between said first rebound chamber and said passage and said second rebound chamber, and said ring guide defining at least one channel spaced circumferentially from and generally parallel to said passage and extending axially from said lower surface toward said upper surface and radially through said ring guide and said catcher and terminating adjacent said catcher and before said upper surface for allowing additional hydraulic fluid to flow radially through said ring guide with said ring in said unblocked position to reduce hydraulic fluid pressure exerted on said ring guide whereby said ring disposed in said blocked position closes the fluid communication between said first rebound chamber and said passage and said at least one channel and said second rebound chamber to provide the additional damping force and said ring disposed in said unblocked position abuts said catcher to establish fluid communication between said first rebound chamber and said passage and said at least one channel and said second rebound chamber.

2. A shock absorber assembly as set forth in claim 1 wherein said passage and said channel are spaced from one another annularly about said ring guide to allow the hydraulic fluid to flow through said ring guide.

3. A shock absorber assembly as set forth in claim 2 further includes a plurality of said passages and a plurality of said channels with said passages and said channels alternating with one another annularly about said ring guide.

4. A shock absorber assembly as set forth in claim 1 wherein said catcher defines at least one window disposed on said catcher and which said window extends from said upper surface toward said lower surface to establish a fluid communication with said channel of said ring guide to allow additional hydraulic fluid flow through said channel and said window.

5. A shock absorber assembly as set forth in claim 4 further includes a plurality of windows disposed annularly around said catcher and spaced from one another.

6. A shock absorber assembly as set forth in claim 1 wherein said ring guide includes first protrusion disposed at said upper surface of said ring guide extending radially outwardly from said upper surface of said ring guide and toward said center axis for engaging said piston rod.

7. A shock absorber assembly as set forth in claim 6 wherein said piston rod defines a first slot disposed on said piston rod adjacent to and spaced from said piston and extending about said piston rod and receiving said first protrusion of said ring guide and securing said ring guide to said piston rod.

8. A shock absorber assembly as set forth in claim 7 further including a retainer disposed in said main chamber spaced from said piston and attached to said piston rod and extending annularly about said piston rod for receiving said ring guide, and said retainer extends between a proximal end adjacent to said ring guide and a coupling end adjacent to and spaced from said piston.

9. A shock absorber assembly as set forth in claim 8 wherein said retainer includes a second protrusion disposed at said coupling end of said retainer extending outwardly from said coupling end of said retainer and toward said center axis for engaging said piston rod, and said piston rod defines a second slot disposed on said piston rod adjacent to and spaced from said piston rod and said first slot and extending about said piston rod to receive said second protrusion of said retainer to secure said retainer to said piston rod.

* * * * *